United States Patent [19]
Naito et al.

[11] Patent Number: 5,253,097
[45] Date of Patent: Oct. 12, 1993

[54] DEMODULATOR AND A POLARIZATION DIVERSITY RECEIVER FOR COHERENT OPTICAL COMMUNICATION PROVIDED WITH THE DEMODULATOR

[75] Inventors: Takao Naito, Kawasaki; Terumi Chikama, Tokyo; Shigeki Watanabe, Kawasaki; Tetsuya Kiyonaga, Kawasaki; Hiroshi Nakamoto, Kawasaki; George Ishikawa, Yokohama, all of Japan

[73] Assignee: Fujitsu Limited, Kanagawa, Japan

[21] Appl. No.: 730,002

[22] Filed: Jul. 15, 1991

[30] Foreign Application Priority Data

Jul. 18, 1990 [JP] Japan .................................. 2-187997

[51] Int. Cl.$^5$ ............................................. H04B 10/06
[52] U.S. Cl. ................................... 359/192; 359/191; 359/195
[58] Field of Search ......................... 375/82; 329/310; 359/189, 190, 191, 192, 194

[56] References Cited

U.S. PATENT DOCUMENTS

| | | | |
|---|---|---|---|
| 4,397,042 | 8/1983 | Tsujii et al. | 359/194 |
| 4,547,738 | 10/1985 | Bayer et al. | 329/310 |
| 4,584,693 | 5/1986 | Levy et al. | 329/310 |
| 4,804,925 | 2/1989 | Iwase et al. | 329/310 |
| 4,870,659 | 9/1989 | Oishi et al. | 375/82 |

FOREIGN PATENT DOCUMENTS 56-034202 4/1981 Japan .
62-181556 8/1987 Japan .

OTHER PUBLICATIONS

*Proceedings of the Forth Tirrenia International Workshop on Digital Communications,* "Coherent Optical Communications and Photonic Switching", pp. 19-34, Sep., 1989.

Primary Examiner—Herbert Goldstein
Assistant Examiner—Rafael Bacares
Attorney, Agent, or Firm—Staas & Halsey

[57] ABSTRACT

A demodulator comprising an OR/NOR circuit, an exclusive OR/NOR circuit, and a delay circuit is disclosed as that capable of being suitably formed into a monolithic IC. Also, a polarization diversity receiver for coherent optical communication using the above demodulator as its constituent is disclosed as that having a smaller number of variable gain amplifiers and accordingly having the controlling circuit made simpler in structure.

20 Claims, 14 Drawing Sheets

DEMODULATOR AND A POLARIZATION DIVERSITY RECEIVER FOR COHERENT OPTICAL COMMUNICATION PROVIDED WITH THE DEMODULATOR

BACKGROUND OF THE INVENTION

1. Field of the Invention

The present invention relates to a demodulator and a polarization diversity receiver for coherent optical communication provided with the demodulator.

The coherent optical transmission method is suitable for long-distance transmission because higher reception sensitivity is obtained thereby than that obtained by the intensity-modulation/direct-detection method in practical use today. Further, since frequency selection can be achieved relatively easily by electrical processing after optical detection has been made, it is suitable for transmission by frequency-division multiplexing at a high density. Now, since the term "detection" is liable to be confused with the term "demodulation", the term "detection" or "optical detection" herein will be used to mean the conversion from an optical signal to an electrical signal (intermediate-frequency signal) and the term "demodulation" will be used to mean the conversion from an intermediate-frequency signal to a baseband signal.

When signal reception is performed through heterodyne detection, it is required in mixing the signal light with the local light that the polarization state of both of the light beams is in agreement. Disagreement between the polarization states leads to deterioration in the reception sensitivity. When, for example, both the signal light and the local light are linearly polarized light and the planes of polarization are orthogonal to each other, there is produced no interference on the photodetecting surface and hence the signal reception becomes unachievable. Since single mode fibers in general are not capable of retaining the polarized state, the polarized state on the receiving end varies due to changes in the environmental conditions with time. Therefore, in order to maintain a required reception sensitivity, it becomes necessary to cope with the variation in the polarization state on the receiving end.

2. Description of the Related Art

As a technique to cope with the variation in the polarization state on the receiving end, there is a polarization diversity system. A prior art example of structure of a polarization diversity receiver for coherent optical communication to which such system is applied is shown in FIG. 19. Reference numeral 111 denotes an optical local oscillator made up of a semiconductor laser or the like. This optical local oscillator 111 outputs local light having a frequency in a specific relation with the frequency of the received signal light. Reference numeral 112 denotes an optical/electrical converter made up of polarization beam splitters, optical couplers, optical detecting circuits, and the like in combination. The converter 112 performs optical/electrical conversion of the received signal and the local light for each of the polarization components, of which the planes of polarization are orthogonal to each other, to thereby output two intermediate frequency signals (IF signals), for each of the polarization components, having the frequency corresponding to the difference between the frequency of the signal light and the frequency of the local light. One of the IF signals is input to a demodulator 115 through variable gain amplifiers 113 and 114, and the other IF signal is separately input to a demodulator 118 through variable gain amplifiers 116 and 117. Demodulated signals from the demodulators are respectively passed through variable gain amplifiers 119 and 120 and added together in an adder 121 and then input to a discriminator 122 whereby the transmitted information is regenerated. Reference numeral 123 denotes a control circuit for controlling gains in each of the variable gain amplifiers and reference numeral 124 denotes an automatic frequency control circuit for controlling the frequency of the local light so that the frequency of the IF signal may be kept constant.

The manner of the gain controlling operation performed in the control circuit 123 will be described below. Total power of the received signal light in general varies with conditions of the light transmission path and the like. Now, we represent the power of the signal light by k. Since the two IF signals output from the optical/electrical converter 112 are based on the polarization components of the signal light having planes of polarization orthogonal to each other, the ratio of power between the two IF signals becomes a: $(1-a)$, where $0 \leq a \leq 1$. Therefore, the power of the IF signal input from the optical/electrical converter 112 to the variable gain amplifier 113 is proportional to ka, and the power of the IF signal input from the optical/electrical converter 112 to the variable gain amplifier 116 is proportional to $k(1-a)$. The variable gain amplifiers 113 and 116 are for coping with variation in the power of the signal light and the amplification factor of them is controlled to be proportional to $k^{-1}$. The term "amplification" herein includes the case where the amplification factor is less than unity, i.e., it includes attenuation. The power of the IF signal output from the variable gain amplifier 113 is rid of the effect of the variation in the total power of the signal light and, hence, is made proportional to a and the power of the IF signal output from the variable gain amplifier 116 is rid of the effect of the same variation and, hence, is made proportional to $(1-a)$. The variable gain amplifiers 114 and 117 are for equalizing the power of the IF signals input to the demodulators 115 and 118. Hence, the amplification factor of the variable gain amplifier 114 is controlled to be proportional to $a^{-1}$ and the amplification factor of the variable gain amplifier 117 is controlled to be proportional to $(1-a)^{-1}$, whereby the power of the IF signals input to the demodulators 115 and 118 are made equal. The variable gain amplifiers 119 and 120 are for weighting the input signal so as to obtain a weighted sum by, for example, the maximum ratio combining law. These amplifiers 119 and 120 perform amplification of the input signals at amplification factors proportional to the S/N ratio or the signal power of the input signal. More specifically, since the power of the IF signals input to the demodulators 115 and 118 are controlled to be equal in the present example, the amplification factor of the variable gain amplifier 119 is set to be proportional to $a^2$, while the amplification factor of the variable gain amplifier 120 is set to be proportional to $(1-a)^2$.

A prior art example of structure of the demodulator is shown in FIG. 20. This demodulator is made up of a branch circuit 130, such as a 3 dB coupler, for providing branch outputs of the input signal, a delay circuit 131 for delaying one of the output signals of the branch circuit 130 by a predetermined delay time and outputting the delayed signal, and a multiplier 132 for multiplying the other of the output signals of the branch circuit 130 and the output signals of the delay circuit 131 together.

As described above, the prior art demodulator was a combination of analog circuits and therefore it has not always been easy to form them in a monolithic integrated circuit structure.

Further, since the prior art demodulator shown in FIG. 20 is an analog circuit using a multiplier (mixer) and the like, it sometimes fails to perform a normal demodulating operation unless the level of the input to the demodulator is held constant. Because of this, in the prior art polarization diversity receiver for coherent optical communication, it was required to provide variable gain amplifiers 114 and 117, as shown in FIG. 19, for holding the power of the IF signals input to the demodulators. Thus, the circuit requires to have at least six variable gain amplifiers in all and a controlling circuit therefor. Therefore, the prior art polarization diversity receiver has had a disadvantage that its structure is complex.

In order to simplify the structure of the polarization diversity receiver, an arrangement in which a variable gain amplifier for coping with the variation in the IF signal due to the power variation in the signal light (for example, the variable gain amplifier 113) and a variable gain amplifier for controlling the power of the IF signal input to the demodulator to be constant (for example, the variable gain amplifier 114) are unified is proposed. In such case, however, the dynamic range of the gain controlling circuit for the unified variable gain amplifier is required to be higher than 30 dB, and therefore, the proposed arrangement is difficult to be practically realized.

SUMMARY OF THE INVENTION

An object of the present invention is to provide a demodulator using digital circuit elements and suitable for being formed into a monolithic integrated circuit.

Another object of the present invention is to provide a polarization diversity receiver for coherent optical communication using the above mentioned demodulator and having a smaller number of variable gain amplifiers and therefore is simpler in structure of the controlling circuit.

In an aspect of the present invention, there is provided a demodulator comprising: an OR/NOR circuit having an input port supplied with an intermediate-frequency signal and a first and a second output port, adapted such that, when the input level at the input port is at a low level, output levels of the first and second output ports are respectively brought to a low level and a high level and, when the input level at the input port is at a high level, output levels of the first and second output ports are respectively brought to a high level and a low level; a delay circuit for delaying the output signal from the second output port of the OR/NOR circuit by a predetermined delay time $\tau$ and outputting the delayed signal; and an exclusive OR/NOR circuit having a first input port supplied with the output signal from the first output port of the OR/NOR circuit, a second input port supplied with the output signal from the delay circuit, and a first and a second output port from which demodulated signals are output, adapted such that, when input levels at the first and second input ports are in phase, output levels at the first and second output ports are respectively brought to a low level and a high level, and when input levels at the first and second input ports are in antiphase, output levels at the first and second output ports are respectively brought to a high level and a low level.

In another aspect of the present invention, there is provided a polarization diversity receiver for coherent optical communication comprising: an optical local oscillator outputting local light; an optical-electrical converter for performing optical-electrical conversion of received signal light and the local light for each of polarization components, of which planes of polarization are orthogonal to each other, thereby outputting two intermediate-frequency signals having the frequency corresponding to the difference between the frequency of the signal light and the frequency of the local light, for each of the polarization components; a first and a second demodulator respectively supplied with the intermediate-frequency signals; and a combining circuit for combining demodulated signals from the first and second demodulators; wherein each of the first and second demodulators comprises: an OR/NOR circuit having an input port supplied with the intermediate-frequency signal and a first and a second output port and adapted such that, when the input level at the input port is at a low level, output levels at the first and second output ports are respectively brought to a low level and a high level and, when the input level at the input port is at a high level, output levels at the first and second output ports are respectively brought to a high level and a low level; a delay circuit for delaying the output signal from the second output port of the OR/NOR circuit by a predetermined delay time $\tau$ and outputting the delayed signal; and an exclusive OR/NOR circuit having a first input port supplied with the output signal from the first output port of the OR/NOR circuit, a second input port supplied with the output signal from the delay circuit, and a first and a second output port outputting demodulated signals, and adapted such that, when the input levels at the first and second input ports are in phase, output levels at the first and second output ports are respectively brought to a low level and a high level and, when the input levels at the first and second input ports are in antiphase, output levels at the first and second output ports are respectively brought to a high level and a low level.

The above and other objects, features and advantages of the present invention and the manner of realizing them will become more apparent, and the invention itself will best be understood from a study of the following description and appended claims with reference had to the attached drawings showing some preferred embodiments of the invention.

BRIEF DESCRIPTION OF THE DRAWINGS

FIGS. 13A-9B are diagrams showing another example of structure of an optical detecting circuit (a double balanced type);

DESCRIPTION OF THE PREFERRED EMBODIMENTS

Preferred embodiments of the present invention will be described below in detail with reference to the accompanying drawings.

Figure 1:
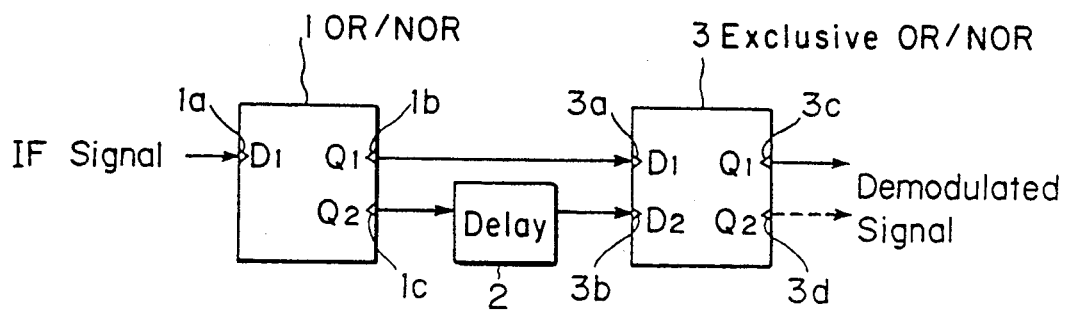
FIG. 1 is a block diagram showing a demodulator according to the present invention.

FIG. 1 is a block diagram showing a demodulator according to the present invention. Reference numeral 1 denotes an OR/NOR circuit realized as a digital circuit element and it has an input port 1a and a first and a second output port 1b and 1c. The OR/NOR circuit 1 functions as follows. That is, when the input level at the input port 1a is a low level, the output levels at the first and second output ports 1b and 1c are respectively brought to a low level and a high level, and when the input level at the input port 1a is a high level, the output levels at the first and second output ports 1b and 1c are respectively brought to a high level and a low level.

The truth table of the OR/NOR circuit 1 is shown in Table 1. Referring to the table, $D_1$ denotes the level at the input port 1a, $Q_1$ denotes the level at the first output port 1b, and $Q_2$ denotes the level at the second output port 1c. Numeral "0" in the table indicates the low level and "1" indicates the high level.

Table 1 Truth Table of the OR/NOR Circuit 1

TABLE 1

| Truth Table of the OR/NOR Circuit 1 | | |
|---|---|---|
| Input Signal | $Q_1$ | $Q_2$ |
| $D_1$ 0 | 0 | 1 |
| 1 | 1 | 0 |

Reference numeral 2 denotes a delay circuit for outputting a delayed signal of the output signal at the second output port 1c of the OR/NOR circuit 1 by a predetermined delay time $\tau$.

Reference numeral 3 denotes an exclusive OR/NOR circuit realized as a digital circuit element. The exclusive OR/NOR circuit 3 has a first input port 3a receiving the output signal of the first output port 1b of the OR/NOR circuit 1, a second input port 3b receiving the output signal of the delay circuit 2, and a first and a second output port 3c and 3d. The exclusive OR/NOR circuit 3 functions as follows. When the input levels at the first and second input ports 3a and 3b are in phase (when the inputs are both at the high level or both at the low level), the output levels at the first and second output ports 3c and 3d are respectively brought to a low level and a high level, and when the input levels at the first and second input ports 3a and 3b are in antiphase (when, for example, the first input port 3a is at a high level and the second input port is at a low level), the output levels at the first and second output ports 3c and 3d are respectively brought to a high level and a low level.

The truth table of the exclusive OR/NOR circuit 3 is shown in Table 2. Referring to the table, $D_1$ and $D_2$ respectively denote the levels at the first input port 3a and the second input port 3b, $Q_1$ denotes the level at the first output port 3c, and $Q_2$ denotes the level at the second output port 3d. Numeral "0" indicates the low level and "1" indicates the high level.

TABLE 2

| Truth Table of Exclusive OR/NOR Circuit | | |
|---|---|---|
| Input Signal | $Q_1$ | $Q_2$ |
| $(D_1, D_2)$ (0, 0) | 0 | 1 |
| (0, 1) | 1 | 0 |
| (1, 0) | 1 | 0 |
| (1, 1) | 0 | 1 |

It is adapted such that an intermediate-frequency signal is input to the input port 1a of the OR/NOR circuit 1 and a demodulated signal is output from the first output port 3c or the second output port 3d of the exclusive OR/NOR circuit 3.

In the foregoing, the OR/NOR circuit 1 was described to be that having one input port. When an ordinary OR/NOR circuit having two input ports is used, one input port may always be set to the low level and the other input port may be used as described above.

According to the arrangement shown in FIG. 1, satisfactory demodulation can be achieved by setting the delay time $\tau$ in the delay circuit 2 to a value fitted for the type of modulation as described later.

Generally, in a digital circuit element such as the OR/NOR circuit 1 and the exclusive OR/NOR circuit 3, the dynamic range is wide. More specifically, the acceptable range of variation of the input level for providing the normal operation of the digital circuit element is wide and, in addition, the output level is virtually constant. For example, the digital circuit element can properly operate with the input amplitude (peak-to-peak) ranging from 0.4 to 1.2 V, approximately, and its output amplitude is constantly around 0.9 V. Therefore, when a polarization diversity receiver for coherent optical communication is arranged using the demodulators of the present invention, the variable gain amplifiers for equalizing the power of IF signals input to the two demodulators can be eliminated and the structure of the receiver can be simplified by such reduction in the number of the gain control loops.

Further, according to the structure of FIG. 1, a demodulator can be realized by the use of the digital circuit elements and a suitable delay line in combination. Hence, it can be easily achieved to form the demodulator in a monolithic IC structure.

FIG. 2 to FIG. 5 are block diagrams showing a first to a fourth basic structure of the polarization diversity receiver for coherent optical communication according to the present invention including the demodulator as shown in FIG. 1.

Figure 2:
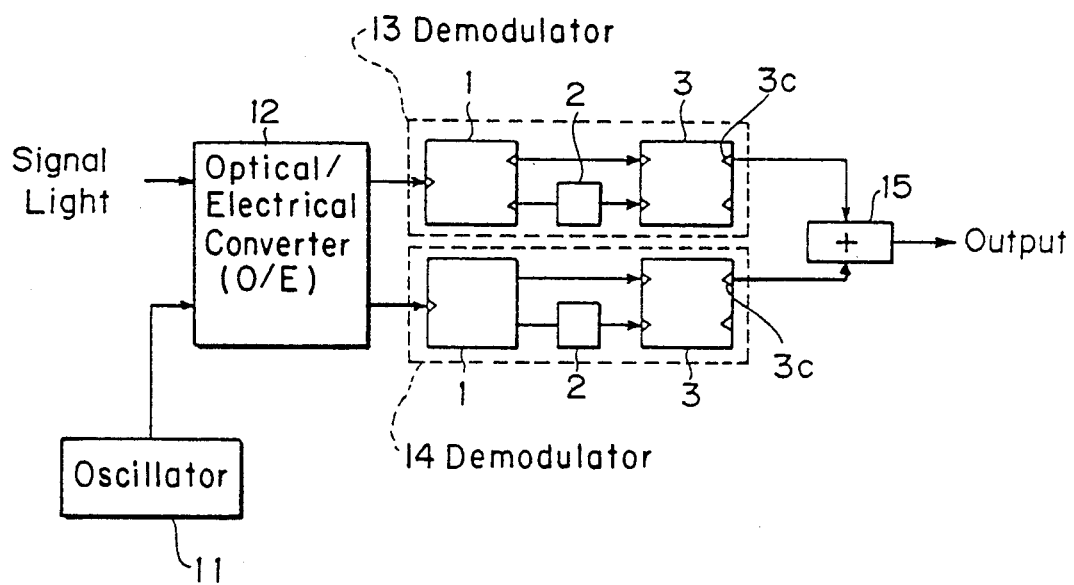
FIG. 2 to FIG. 5 are block diagrams showing a first to a fourth basic structure of the polarization diversity receiver for coherent optical communication according to the present invention.

Throughout these drawings, the same reference numerals denote the same objects. Referring to FIG. 2, reference numeral 11 denotes an optical local oscillator for outputting local light. Reference numeral 12 denotes an optical-electrical converter, and this optical-electrical converter 12 performs optical-electrical conversion of a received signal light, and the local light, for each of polarization components, of which planes of polarization are orthogonal to each other, to thereby output two intermediate-frequency signals (IF signals) for each of the polarization components with a frequency corresponding to the difference between the frequency of the signal light and the frequency of the local light.

Reference numerals 13 and 14 respectively denote a first and a second demodulator of the structure as shown in FIG. 1. These demodulators 13 and 14 are respectively supplied with the above described intermediate-frequency signals. Particular examples of setting up of the delay time in the delay circuit of the demodulator will be described later.

Reference numeral 15 denotes an adder, which adds up to the signal from the first output port 3c of the first demodulator 13 and the signal from the first output port 3c of the second demodulator 14.

Figure 3:
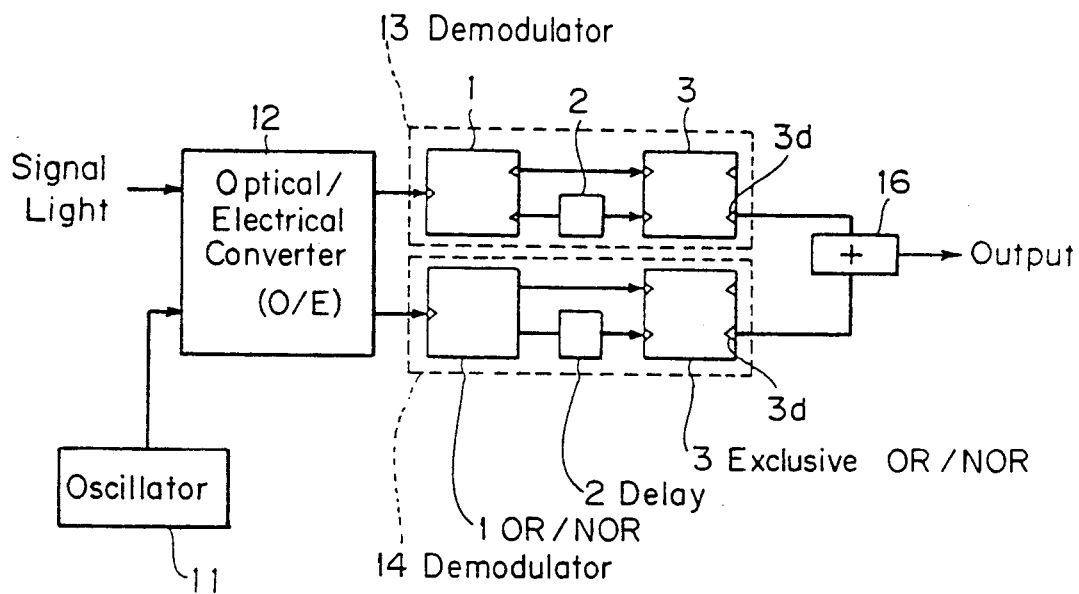

In the second basic structure shown in FIG. 3, the signal from the second output port 3d of the first demodulator 13 and the signal from the second output port 3d of the second demodulator 14 are added up by the adder 16.

Figure 4:
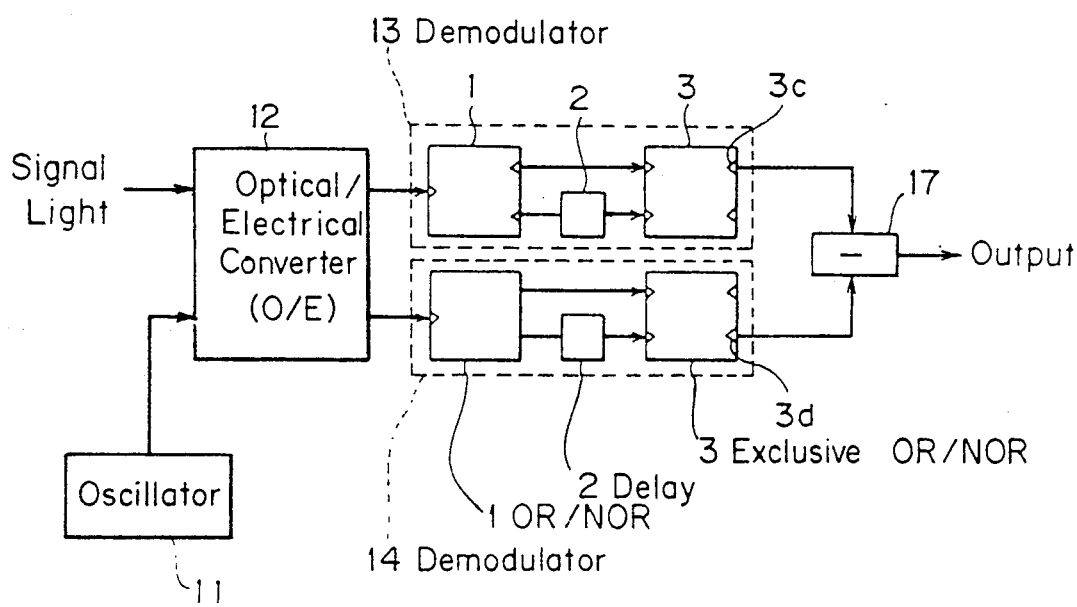

In the third basic structure shown in FIG. 4, the signal from the first output port 3c of the first demodulator 13 and the signal from the second output port 3d of the second demodulator 14 are subjected to subtraction in the subtractor 17.

Figure 5:
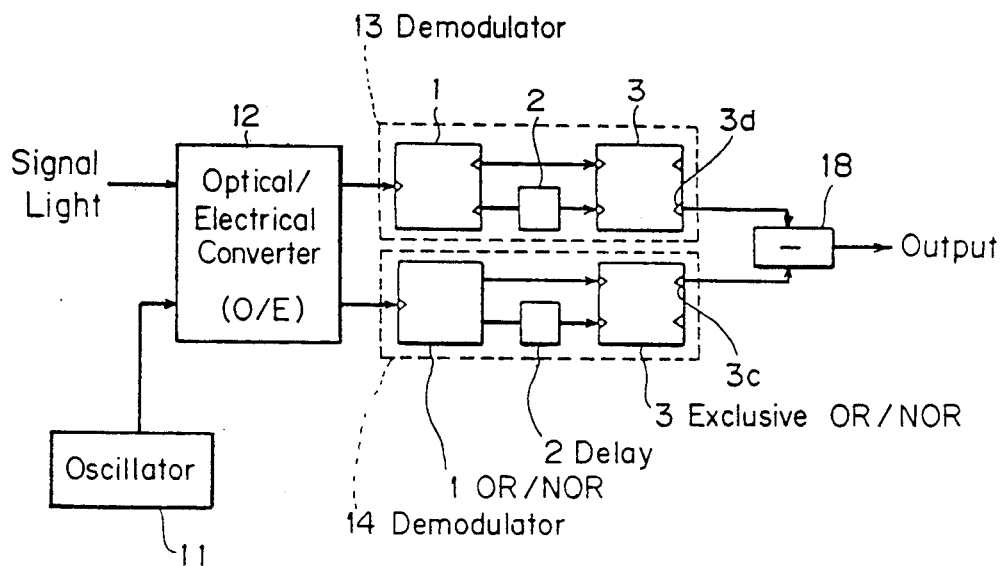

In the fourth basic structure shown in FIG. 5, the signal from the second output port 3d of the first demodulator 13 and the signal from the first output port 3c of the second demodulator 14 are subjected to subtraction in the subtractor 18.

According to the first, second, third, or fourth basic structures of the receiver, the demodulated signals can be obtained from either or both of the first and second demodulators even if a variation occurs in the state of polarization of the signal light. Therefore, by combining the obtained demodulated signals by means of the adder or subtractor, reception of the signal light can be achieved at all times irrespective of the state of polarization of the signal light.

Figure 6:
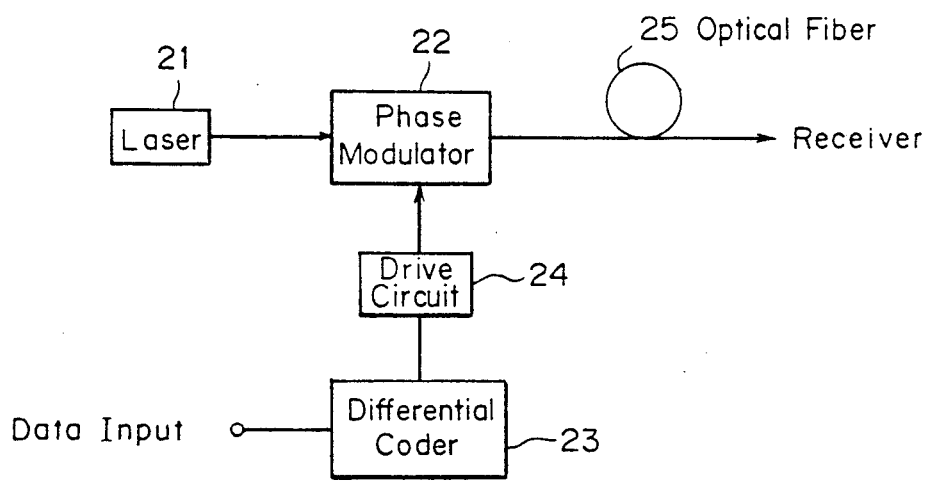
FIG. 6 is a block diagram showing an example of structure of the transmitter applicable to a DPSK system.

FIG. 6 is a block diagram showing an example of structure of a transmitter for coherent optical communication applicable to a differential phase shift keying system (DPSK system). Reference numeral 21 denotes a semiconductor laser controlled so as to output light of predetermined amplitude and frequency and 22 denotes a phase modulator for modulating the phase of the light from the semiconductor laser 21. In order that asynchronous demodulation by one-bit delay is performed on the receiver side, the input data is differential-coded by a differential coder 23, and based on the thus differential-coded signal, a drive circuit 24 for the phase modulator 22 is operated. The phase modulated light is transmitted to the receiver through an optical fiber 25.

When the receiver of the present invention is used in the above described DPSK system, the delay time $\tau$ in the delay circuit of the first and second demodulators is set to a time T corresponding to one time slot of the modulated signal (the reciprocal of the bit rate). Since differential coding is carried out on the transmitter side, faithful regeneration of the transmitted information can be achieved by the setting up of the delay time in the demodulator as described above.

Figure 7:
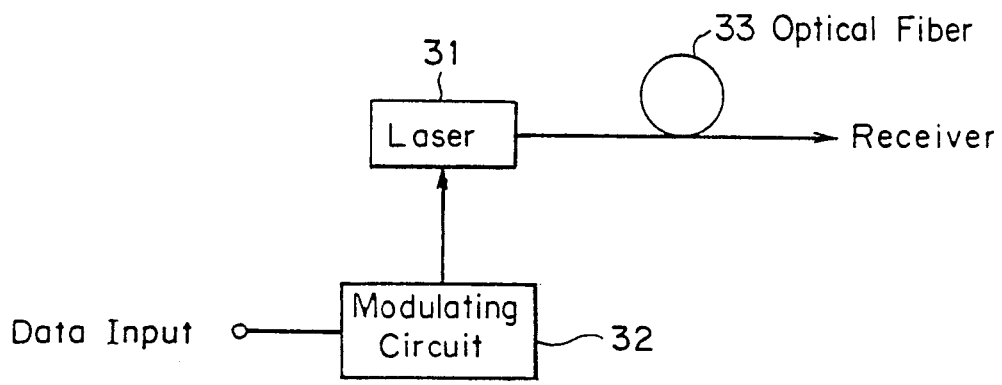
FIG. 7 is a block diagram showing an example of structure of the transmitter applicable to a CPFSK system.

FIG. 7 is a diagram showing an example of structure of a transmitter applicable to a continuous phase frequency shift keying system (CPFSK system). Reference numeral 31 denotes a semiconductor laser whose oscillation frequency can be varied by controlling the injection current or the like, 32 denotes a modulating circuit varying the oscillation frequency of the semiconductor laser 31 in accordance with input data, which adjusts the shift amount of the oscillation frequency based on the input data so that the phase shift amount between different signs may exceed $\pi$. In the CPFSK system, the transmitter side directly modulates the oscillation frequency of the semiconductor laser without using an external modulator, and the receiver side detects the phase shift in the received signal light (IF signal) to thereby regenerate the transmitted information.

When the receiver of the present invention is used in the CPFSK system, the delay time $\tau$ in the delay circuit of the first and second demodulators is set up, according to the modulation index m, as $$\tau = T/2m,$$

where T is the time corresponding to one time slot of the modulated signal. The modulation index m is defined as follows:

$$m = \Delta F/B,$$

where $\Delta F$ represents the frequency shift amount and B represents the bit rate of the modulated signal. In the CPFSK system, the transmitter side requires neither external modulator nor differential coding circuit and therefore the system structure can be simplified.

Figure 8:
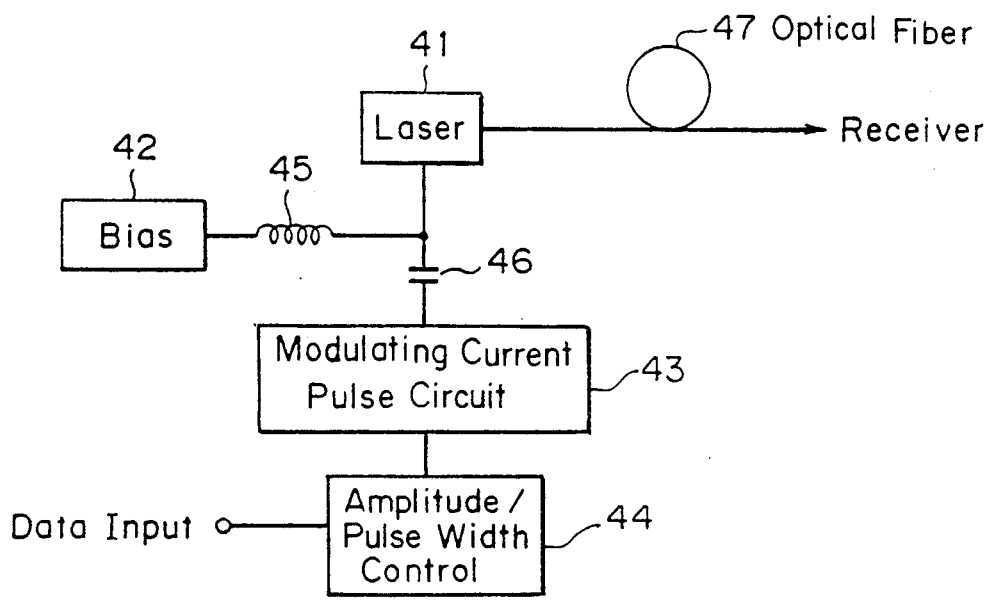
FIG. 8 is a block diagram showing an example of structure of the transmitter applicable to a DM-PSK system.

FIG. 8 is a block diagram showing an example of structure of a transmitter applicable to a direct modulation phase shift keying system (DM-PSK system), which was earlier proposed by us. Reference numeral 41 denotes a semiconductor laser of, for example, the DFB type, which semiconductor laser 41 outputs light of a frequency corresponding to the injected current. The injected current is supplied by means of a bias current circuit 42 and a modulating current pulse circuit 43. A DC current as the bias is supplied to the semiconductor laser 41 through an inductance 45 and a high speed modulating current pulse is supplied to the semiconductor laser 41 through a capacitor 46. The modulating current pulse has a pulse width smaller than one time slot T of the binary coded input signal. An amplitude/pulse width controlling circuit denoted by reference numeral 44 controls the amplitude and pulse width of the modulating current pulse in accordance with the input data such that the integrated value of the oscillation frequency of the semiconductor laser 41 varied by the modulating current pulse becomes a phase amount of $\pi$ or $-\pi$ at all times. The light output of the semiconductor laser 41 is transmitted to the receiver side through an optical fiber 47.

Figure 9A:
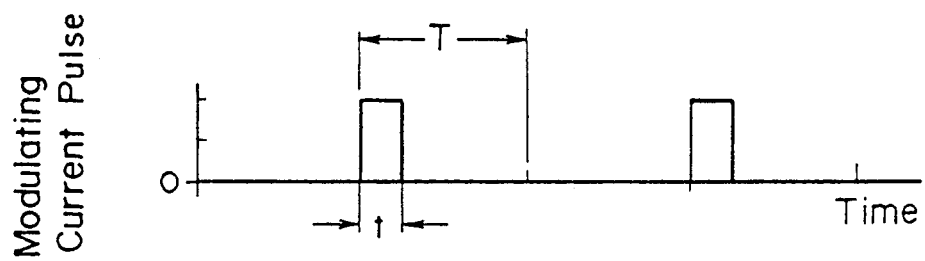
FIGS. 9A-9C are diagrams for explaining the principle of operation in the DM-PSK system.
Figure 9B:
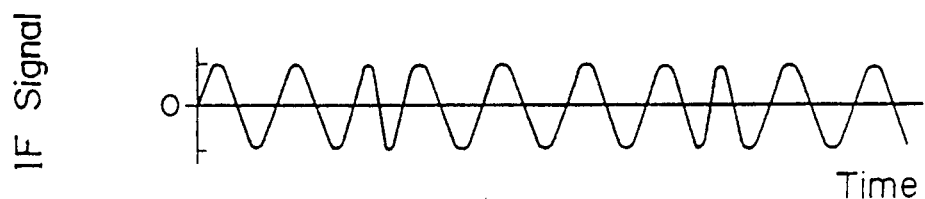
Figure 9C:
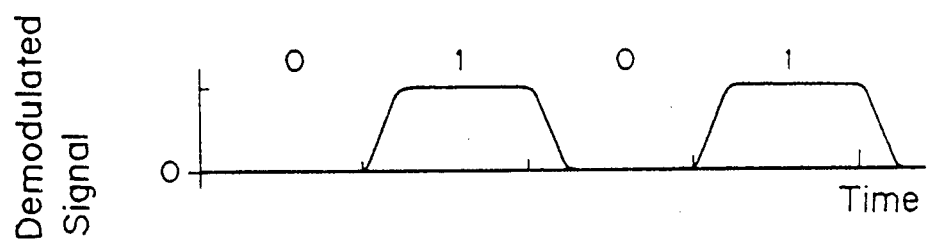

FIG. 9 is a diagram for explaining the operating principle of the DM-PSK system, in which FIG. 9A indicates the waveform of the modulating current pulse, FIG. 9B indicates the waveform of the IF signal, and FIG. 9C indicates the waveform of the demodulated signal. Incidentally, each waveform is that obtained when the input data is "0101". Thus, in the DM-PSK system, it is adapted such that the oscillation frequency is shifted by $\Delta F$ only for a predetermined modulation time t within one time slot T and thereafter the oscillation frequency is returned to the original frequency. The quantities t and $\Delta F$ are set up such that the phase shift becomes $\pi$ or $-\pi$ after the time t has passed. That is, the relationship between t and T is set up to satisfy $$t = T/2m,$$

where m represents the modulation index, which is defined through the use of the frequency shift $\Delta F$ and bit rate B as follows:

$$m = \Delta F/B.$$

Figure 10:
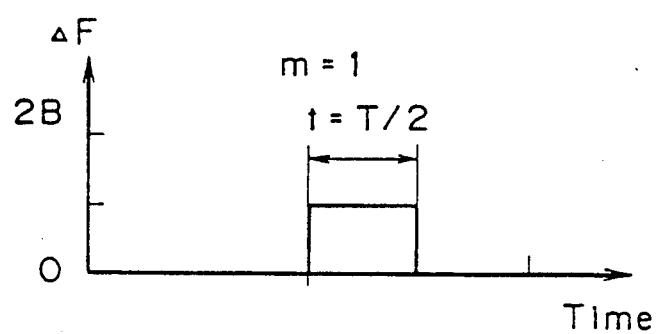
FIG. 10 is a diagram for explaining an example of setting up of driving waveform in the DM-PSK system.
Figure 10:
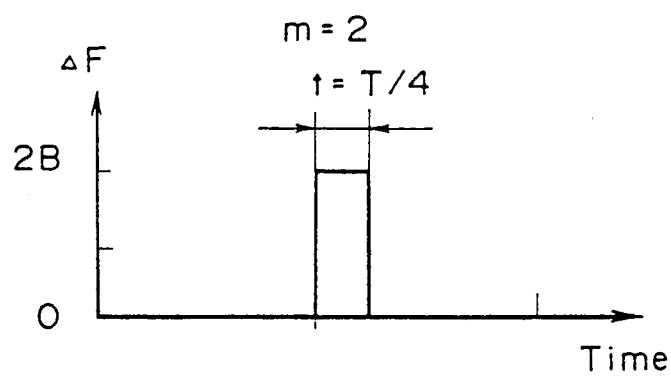

An example of setting up of a driving waveform corresponding to the modulation index is shown in FIG. 10. When m=1, we obtain t=T/2 and $\Delta F$=B. When m=2, we obtain t=T/4 and $\Delta F$ =2B. By setting the modulation index m so as to satisfy 0.5<m, a modulating current pulse with a smaller pulse width than one time slot T of the binary coded input signal can be obtained.

When the receiver of the present invention is used in the DM-PSK system, the delay time $\tau$ in the delay circuit for the first and second demodulators is set, as seen from the operating principle of the system, to a time T corresponding to one time slot of the modulated signal. By the setting up of the delay time, faithful regeneration of the transmitted information can be achieved.

In the DM-PSK system, neither external modulator nor differential encoder is required and hence the structure of the system can be simplified. In addition, since the FM modulation characteristic of the semiconductor laser is over 10 GHz, fast operation can be achieved. Besides, the system is less affected by wavelength dispersion of the optical fiber than the CPFSK system and hence transmission over a longer distance can be achieved.

Figure 11:
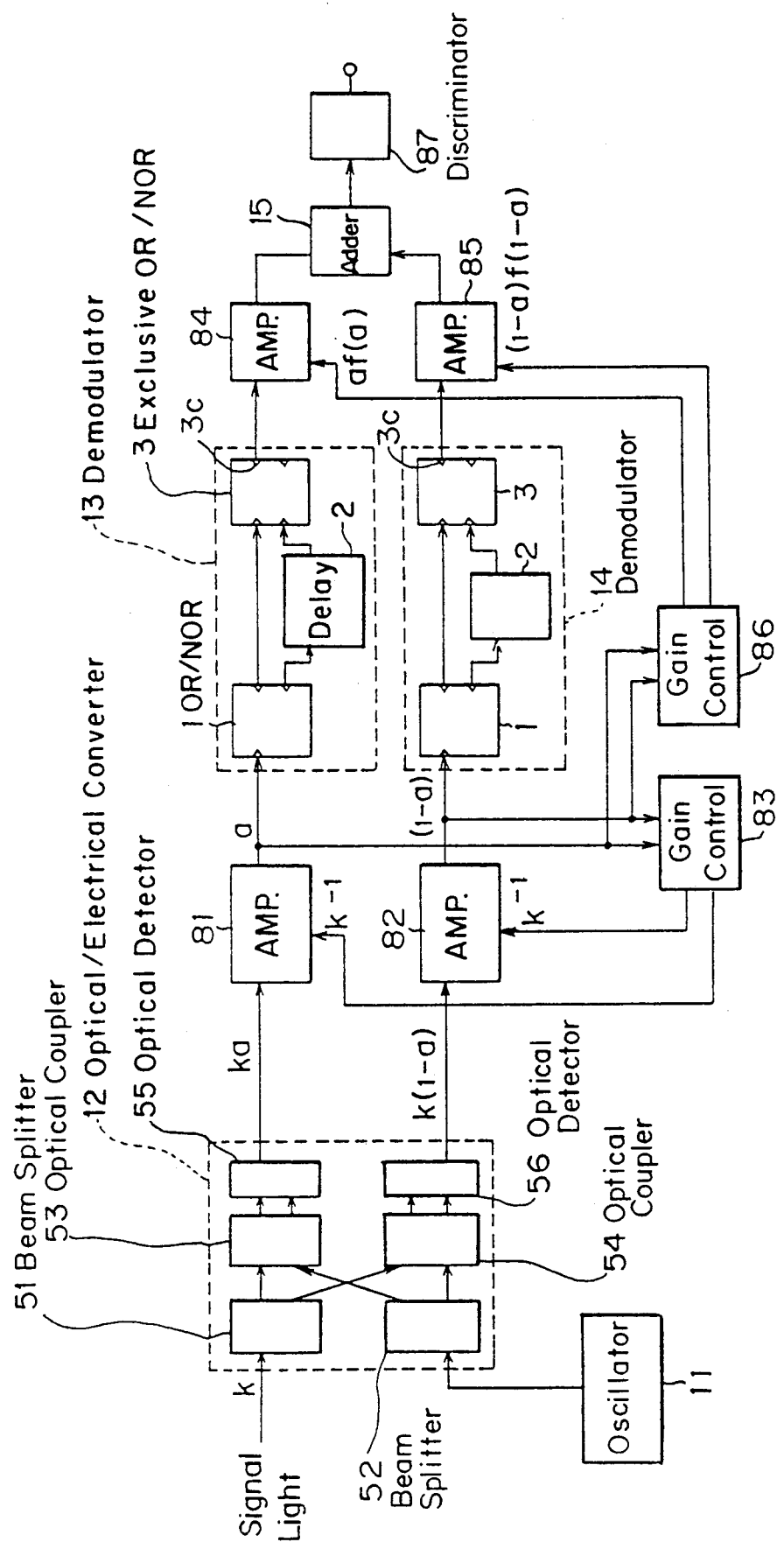
FIG. 11 is a block diagram showing a first embodiment of the polarization diversity receiver for coherent optical communication according to the present invention.

FIG. 11 is a block diagram showing a first embodiment of the polarization diversity receiver for coherent optical communication according to the present invention.

The optical-electrical converter 12 is arranged for example as described below. In the present embodiment, the optical-electrical converter 12 is made up of a first and a second polarization beam splitter 51 and 52, respectively separating the signal light and the local light into polarization components of which the planes of polarization are orthogonal to each other, a first and a second optical coupler 53 and 54 respectively adding up the polarization components from the polarization beam splitters having the same plane of polarization in one and the other direction and then bisecting the combined light and outputting the bisected light beams and a first and a second optical detecting circuit 55 and 56 for optical-electrical conversion of the light from the optical couplers into IF signals. By the use of a fiber coupler of a polarization-plane maintaining type, the state of polarization of the light input to the optical detecting circuits 55 and 56 (the specific polarization component of the signal light and the specific polarization component of the local light) can be defined so that the detecting efficiency is enhanced.

Figure 12:
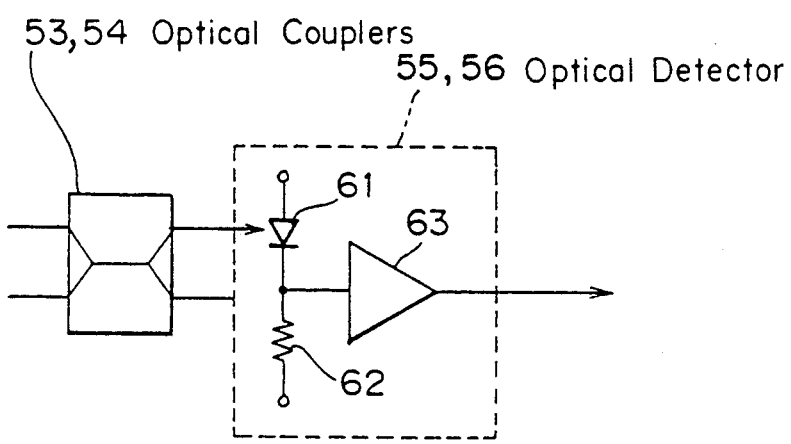
FIG. 12 is a diagram showing an example of structure of an optical detecting circuit.

FIG. 12 shows an example of structure of the optical detecting circuit 55, 56. In this example, the optical detecting circuit 55, 56 includes a single photodetector element 61 of a PIN photodiode or the like, and each photodetector element 61 is adapted to receive one portion of the light beams bisected by the first and second optical couplers 53 and 54. The photodetector element 61 is applied with a reverse bias as usual and the optical current produced in the photodetector element 61 is passed through a load resistor 62. The IF signal generated as the change in potential at the junction of the photodetector element 61 and the load resistor 62 is amplified by a front-end amplifier 63 to be output from the optical detecting circuit 55, 56. If it is permitted by the optical arrangement, both portions of light beams bisected by the optical coupler 53, 54 may be detected by a single photodetector element 61.

Figure 13A:
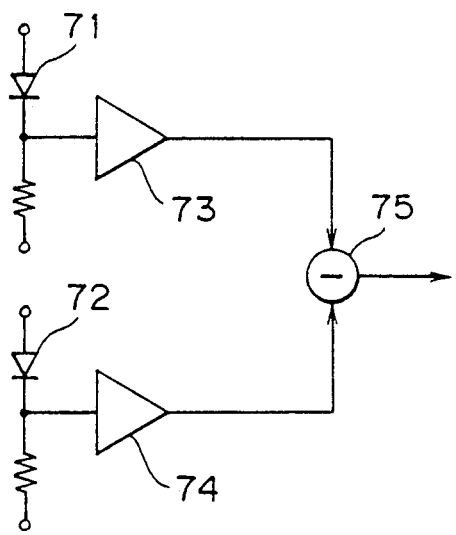
Figure 13B:
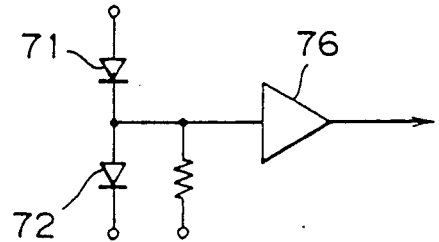

Structure of a double balanced type optical detecting circuit as another example of structure of the optical detecting circuit 55, 56 is shown in FIG. 13. In the structure shown in FIG. 13A, it is adapted such that changes in the optical currents produced in two photodetector elements 71 and 72 formed of a PIN photodiode or the like and are of substantially the same characteristics are extracted as voltage changes, which are respectively amplified in front-end amplifiers 73 and 74 and then subjected to subtraction in a subtractor 75. In the described arrangement, by equalizing the lengths of the optical paths of the light beams entering the photodetector elements 71 and 72 from the coupler 53 or 54, the signal components input to the photodetector elements 71 and 72 are rendered in antiphase and the intensity noise components of the local light are rendered in phase as the result of inversion of optical phase in the optical coupler. Accordingly, the signal components are added together and the intensity noise components are canceled with each other so that the effect of the intensity noise of the local light can be suppressed. Further, since both portions of the light beam bisected by the optical coupler can be economically used, the reception sensitivity is advantageously improved. It is also well to arrange as shown in FIG. 13B such that photodetector elements 71 and 72 similarly of the same characteristics are connected in series and the change in potential at the junction is output after being amplified by a front-end amplifier 76.

In the arrangement of the optical-electrical converter 12 shown in FIG. 11, in order to enhance the interference efficiency between the signal light and the local light, polarization beam splitting is applied to both the signal light and the local light and, thereafter, the optical detection is performed for each of the polarization components. However, optical detection may also be achieved by adding linearly polarized local light obtained by means of polarization maintaining fiber coupler, not by means of polarization beam splitting, to each of polarization components of the signal light obtained by the polarization beam splitting. Further, in the illustrated case, the signal light and the local light are each first subjected to polarization beam splitting in the polarization beam splitters and then added together and bisected by the optical couplers, but the signal light and the local light may be first added together and bisected by an optical coupler and then subjected to polarization beam splitting in a polarization beam splitter.

Referring to FIG. 11, reference numerals 81 and 82 denote a first and a second variable gain amplifier for respectively amplifying the IF signals input from the optical-electrical converter 12 to first and second demodulators 13 and 14, and 83 denotes a first gain controlling circuit for detecting the power of the IF signals for each of the polarization components and controlling the gains of the amplifiers 81 and 82 so that the sum total of the power may be kept constant. By the provision of such control loop, it becomes possible to supply the first and second demodulators 13 and 14 with IF signals of constant total power, not suffering from undesired power variations of the signal light. The reason why the sum total of the power is here controlled to be constant is because the sum total of the power is proportional to the power of the received signal light. More specifically, the optical currents produced in the photodetector elements of the photo detecting circuits 55 and 56 are each proportional to the square root of the product of the power of the signal light and the power of the local light and the power of the IF signal is proportional to the square of the optical current, and therefore, the sum total of the power of the IF signals obtained for each of the polarization components becomes proportional to the power of the received signal light.

In the present embodiment, there are provided a third and a fourth variable gain amplifiers 84 and 85 respectively amplifying the signals input from the first and second demodulators 13 and 14 to the adder 15 and a second gain controlling circuit 86 for detecting the power of the IF signals for each of the polarization components and controlling the gains of the third and fourth variable gain amplifiers 84 and 85 on the basis of a weighting function, in which the ratio of division of the power is taken as a parameter. Reference numeral 87 denotes a discriminator.

By having the signals weighted as described above, it can be arranged such that a demodulated signal of smaller power is output from that demodulator which is supplied with an IF signal of smaller power, of the first and second demodulators 13 and 14, while a demodulated signal of larger power is output from that demodulator which is supplied with an IF signal of larger power, and therefore, the increase of the noise due to the provision of two demodulators can be suppressed to a minimum and the reception sensitivity can be enhanced.

Figure 14:
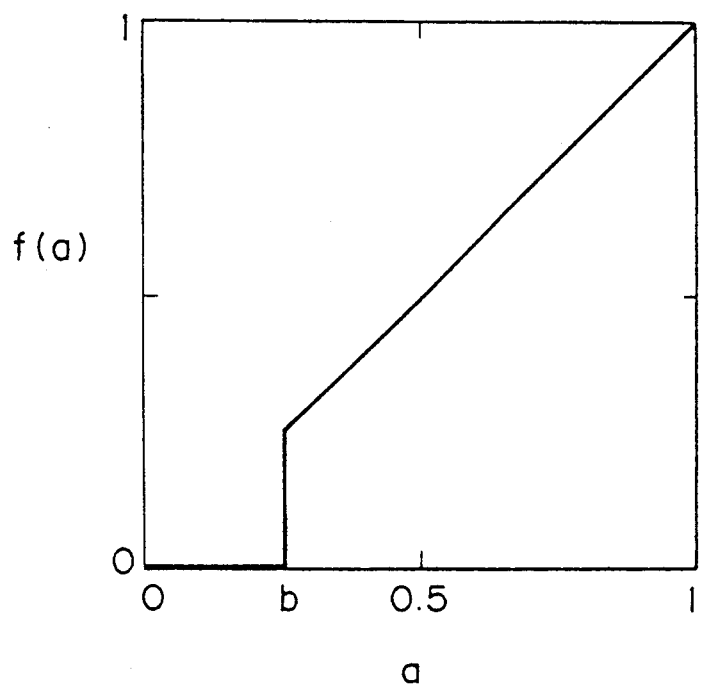
FIG. 14 is a graph showing an example of weighting function f(a)

In the case where digital circuit elements such as the demodulator of the present invention are used, there is the possibility that the demodulator makes a malfunction when an input signal beyond the input dynamic range is input thereto. Accordingly, in the preferred embodiment of the present invention, a weighting function is employed whereby an output signal is cut off when an IF signal at a level beyond a predetermined range is input. More specifically, in the preferred embodiment of the present invention, when the divided ratio of the power between the intermediate-frequency signals respectively input to the first and second demodulators 13 and 14 is denoted as a: (1−a), the weighting function f(a), using a cutoff point b expressed as $$b = 10^{D/10},$$

where D (dB) represents the input dynamic range of the first and second demodulators 13 and 14, is set up as $$f(a) = \begin{cases} 0 & (0 \leq a \leq b) \\ a & (b < a \leq 1) \end{cases}$$

and the gains in the third and fourth variable gain amplifiers 84 and 85 are controlled to be respectively proportional to af(a) and (1−a)f(1−a). A graph of the weighting function f(a) when the dynamic range is 6 dB is shown in FIG. 14. In this case, the cutoff point b is 0.25.

Now, the deterioration in the reception sensitivity in the case where the weighting function f(a) as shown in FIG. 14 is adopted will be considered.

Generally, the quantity of deterioration d from the ideal signal-to-noise ratio is expressed as a function of the weighting function f(a) as $$d = 10 \log_{10} \frac{[\{af(a)\}^{\frac{1}{2}} + \{(1-a)f(1-a)\}^{\frac{1}{2}}]^2}{f(a) + f(1-a)} \text{ [dB]}$$

Figure 15:
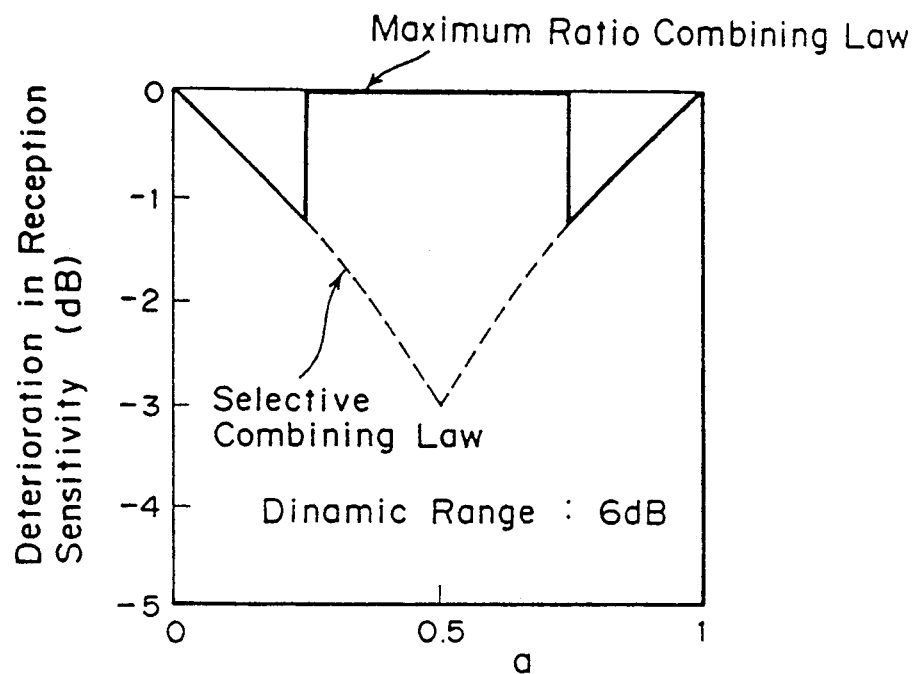
FIG. 15 is a graph showing the dependency on polarization of deterioration in the reception sensitivity.

The relationship between the deterioration (dB) in the reception sensitivity and a when the weighting function f(a) as shown in FIG. 14 is adopted is shown in FIG. 15. When $0 \leq a \leq b$, hence f(a)=0, the deterioration in the reception sensitivity varies along the selective combining law, whereby selective demodulation is performed only for a relatively large demodulated signal, and in this case, deterioration in the reception sensitivity varies in dependence on a. On the other hand, when $b < a \leq 1$, hence f(a)=a, the deterioration in the reception sensitivity varies along the maximal ratio combining law. That is, in this case, there in no deterioration in the reception sensitivity.

As apparent from FIG. 15, the deterioration in the reception sensitivity becomes a maximum when a=b, and therefore, decreasing b is effective for improving the reception sensitivity. That is, the deterioration in the reception sensitivity can be suppressed by forming the first and second demodulators with digital circuit elements having a larger input dynamic range.

Figure 16:
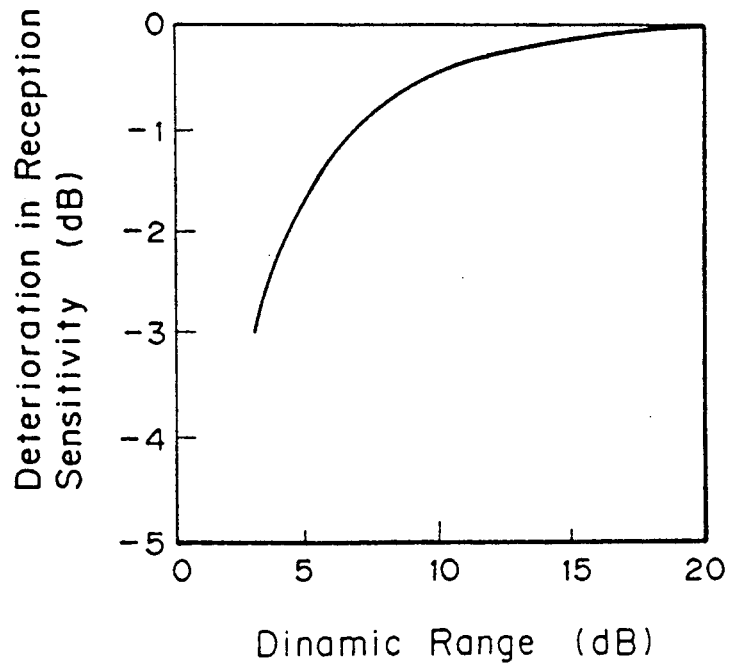
FIG. 16 is a graph showing the relationship between deterioration in the reception sensitivity and dynamic range.

FIG. 16 is a graph showing the relationship between the deterioration in the reception sensitivity and the input dynamic range. It is apparent that the deterioration in the reception sensitivity decreases as the dynamic range increases. When the dynamic range is over 20 dB, the deterioration in the reception sensitivity becomes under 0.1 dB and then a practically satisfactory reception sensitivity can be obtained.

In the present embodiment, as described above, it is adapted such that weighting of demodulated signals is performed along the maximum ratio combining law as much as possible before they are added up and the weighting along the maximum ratio combining law is given up depending on the input dynamic range of the demodulator and it is shifted over to the selective combining law.

Weighting along the maximum ratio combining law can be achieved also by employing another weighting function than that used in the above described example. More specifically, in another preferred embodiment of the present invention, when the divided ratio of the power of the intermediate-frequency signals respectively input to the first and second demodulators 13 and 14 is denoted as a: (1−a), the weighting function f(a), using a cutoff point b expressed as $b = 10^{-D/10}$, where D (dB) represents the input dynamic range of the first and second demodulators 13 and 14, and also using a function $f_1(a) = a/F(\frac{1}{2} - a)$, where $F(\frac{1}{2} - a)$ is an even function, is set up as $$f(a) = \begin{cases} 0 & (0 \leq a \leq b) \\ f_1(a) & (b < a \leq 1) \end{cases}$$

and the gains in the third and fourth variable gain amplifiers 84 and 85 are controlled to be respectively proportional to af(a) and (1−a)f(1−a). It is apparent that the same effect as obtained in the preceding embodiment can be obtained in this case in view of the structure of the weighting function.

In executing the weighting, it is preferred that the cutoff point b is set to b<0.5. In other words, it is preferred that the input dynamic range of the demodulator is set larger than 3 dB. This is because, unless the cutoff point b or the input dynamic range D satisfies the above described condition, the portion being along the maximum ratio combining law in FIG. 15 gets substantially lost and it becomes unable to effectively remedy the deteriorating reception sensitivity.

Figure 17:
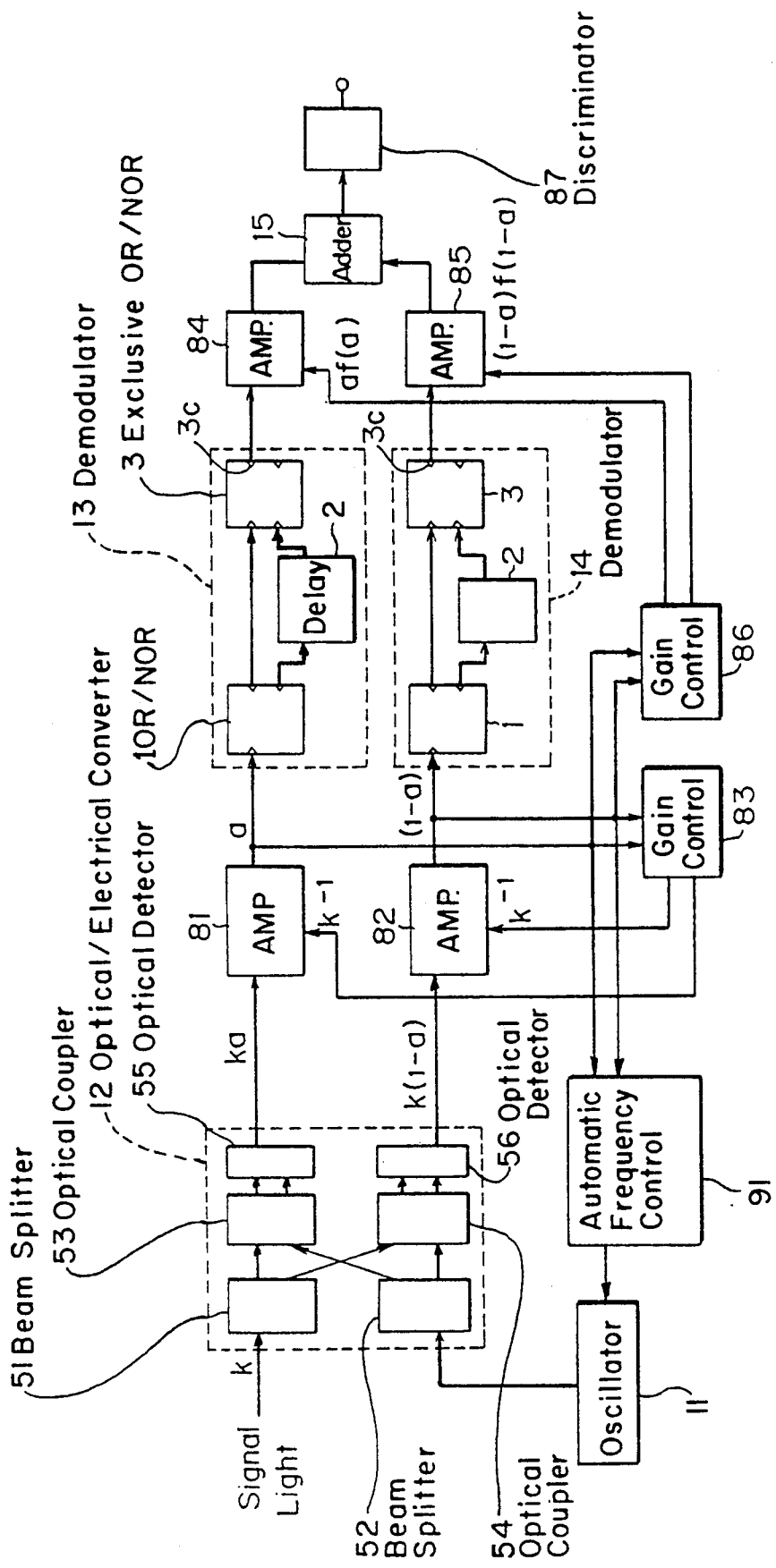
FIG. 17 and FIG. 18 are block diagrams showing a second and a third embodiment of the polarization diversity receiver for coherent optical communication according to the present invention.

FIG. 17 is a block diagram showing a second embodiment of the polarization diversity receiver for coherent optical communication according to the present invention. What is different in this embodiment from the first embodiment is that the structure of the second embodiment includes, in addition to the structure of the first embodiment, an automatic frequency control circuit (AFC circuit) 91 for detecting the frequency of the IF signal and controlling the frequency of the local light so that the frequency of the IF signal may be held constant. The IF signal to be input to the AFC circuit 91 may be obtained from the output port of the first and second variable gain amplifiers 81 and 82 as shown in the diagram or it may be obtained from the output port, not shown, of the optical-electrical converter 12. With this arrangement, it becomes possible to obtain an IF signal whose center frequency is held constant regardless of any undesired frequency variation occurring in the signal light and/or the local light and, therefore, a normal demodulation operation can be secured.

Figure 18:
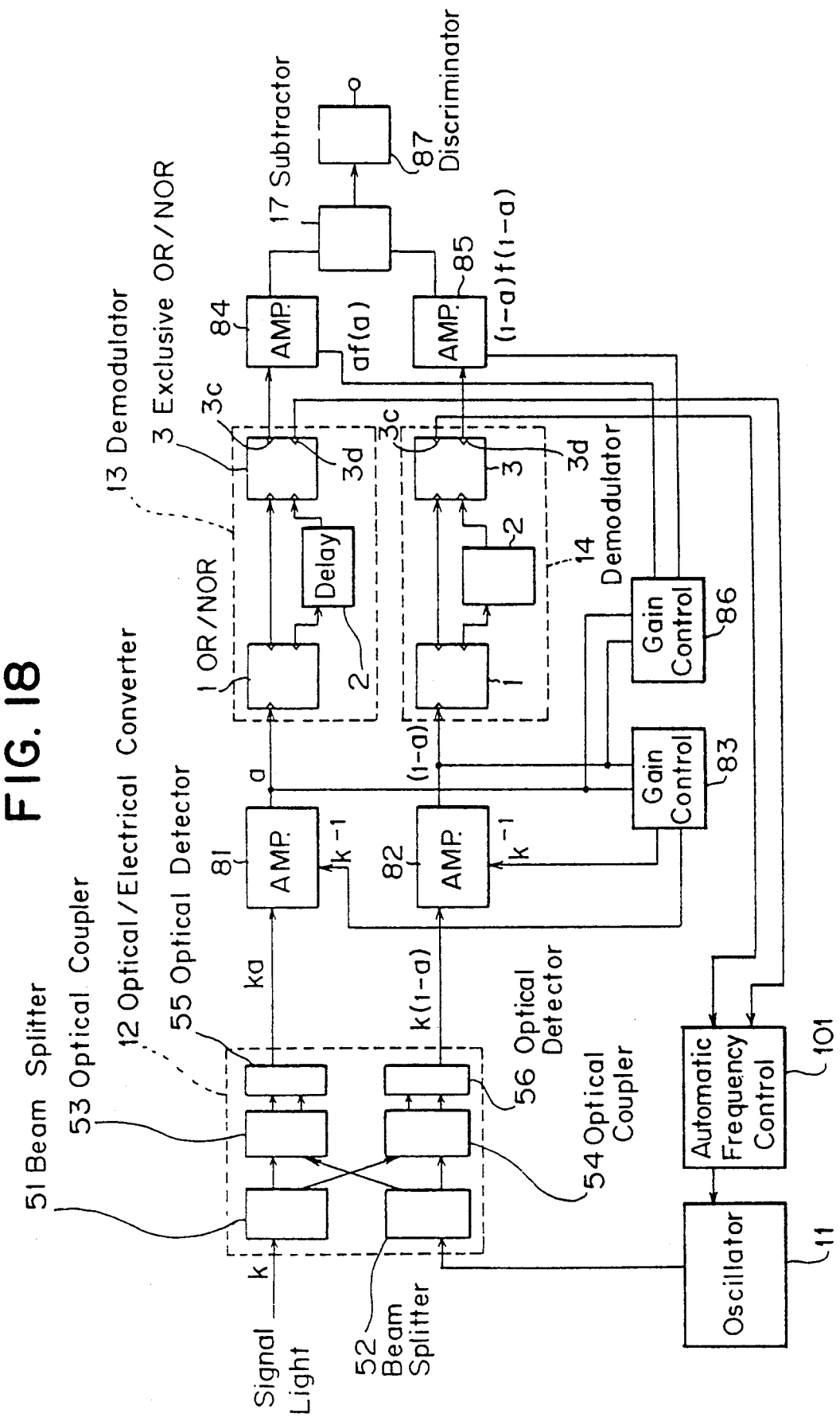
Figure 19:
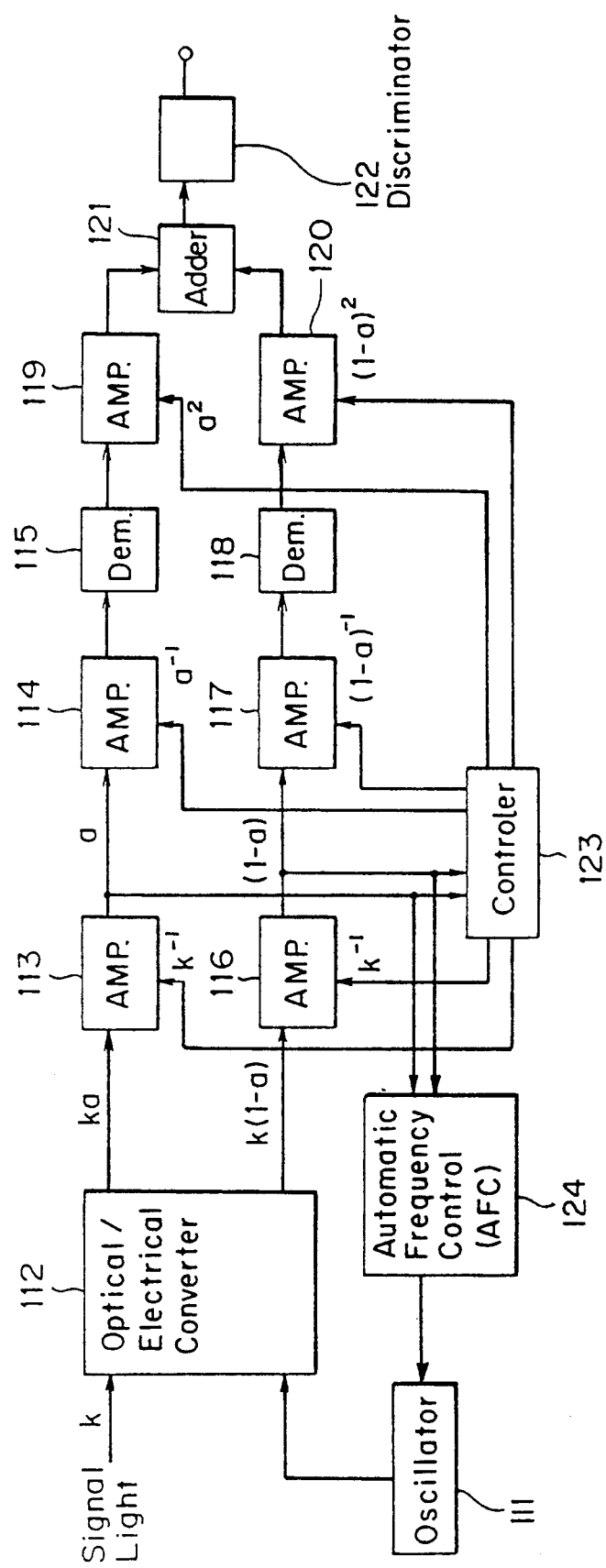
FIG. 19 is a block diagram showing a prior art polarization diversity receiver for coherent optical communication.
Figure 20:
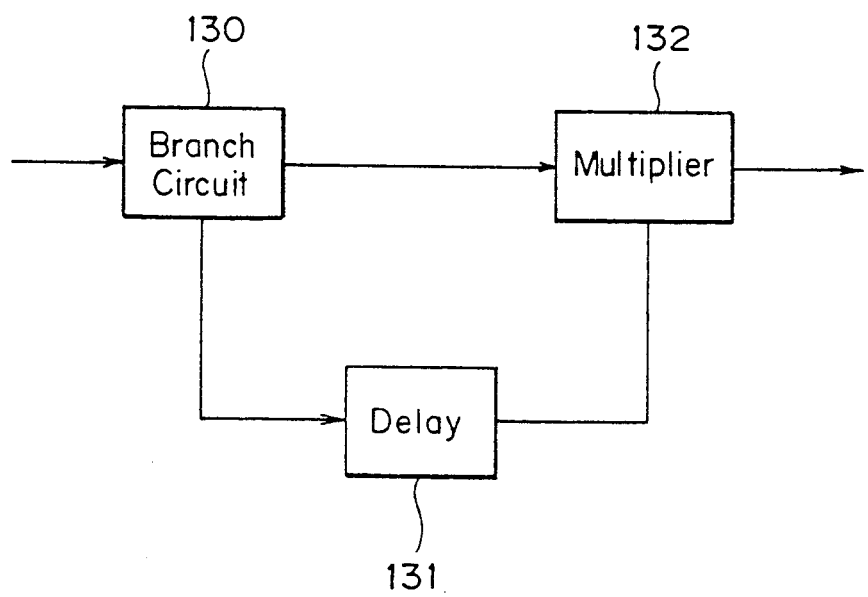
FIG. 20 is a block diagram showing a prior art demodulator.

FIG. 18 is a block diagram showing a third embodiment of the polarization diversity receiver for coherent optical communication according to the present invention. What are different in this embodiment from the second embodiment are that it employs the demodulators of the third basic structure instead of the demodulators of the first basic structure and includes, instead of the AFC circuit 91, an AFC circuit 101 detecting the average level of the demodulated signals for controlling the frequency of the local light such that the average level is held constant. The arrangement using a subtractor for combining the demodulated signals as shown in the third basic structure is easier to realize than that using an adder for combining the demodulated signals, especially when the bit rate of the demodulated signal is high, because a subtractor of a very simple structure can be realized through the use of a differential pair of transistors when the circuits are arranged in an IC. The reason why the average level (DC level) of the demodulated signals is detected in the AFC circuit 101 is because the demodulators 13 and 14 function also as a frequency discriminator and the average level of the demodulated signals depends on the frequency of the IF signal. Accordingly, the use of such AFC circuit 101 eliminates the need for a frequency-voltage converter in the AFC circuit and simplifies the structure of the AFC loop. Incidentally, the AFC control is also applicable to the case where the demodulator of the first basic structure is employed.

According to the present invention, as described above, an effect can be obtained that the structure can be simplified of the polarization diversity receiver for coherent optical communication for coping with the variation in the polarization state of the signal light at the receiving end. Further, since the demodulator is formed of digital circuit elements, such effects can be obtained that the electronic circuit portion of the receiver can be arranged into an IC and the apparatus can be made smaller in size and that mass production of the apparatus can be made easier. Besides, by weighting the demodulated signals in accordance with a specific weighting function, such an effect can be obtained that a malfunction of the demodulator is prevented.

In the foregoing, the present invention is described as related to specific embodiments but the present invention is not limited to details of such embodiments. For example, embodiments can be made on the basis of the second or the fourth basic structure of the polarization diversity receiver for coherent optical communication similarly to the embodiment on the basis of the first or the third basic structure. Further, as the OR/NOR circuit of the demodulator in the present invention, the portion of the circuit elements of the exclusive OR/-NOR circuit functioning as the OR/NOR circuit can be used.

Thus, preferred embodiments described herein are given by way of illustration only and not limitative of the present invention. The scope of the invention is defined by the appended claims and all changes and modifications as fall within the equivalence of the scope of the claims are therefore to be embraced by the invention.

What is claimed is:

1. A demodulator in an optical receiver for demodulating a modulated optical signal, comprising:

an OR/NOR circuit having an input port supplied with an intermediate-frequency signal obtained from the modulated optical signal and a first and a second output port, adapted such that, when the input level at said input port is at a low level, output levels of said first and second output ports are respectively brought to a low level and a high level and, when the input level at said input port is at a high level, output levels of said first and second output ports are respectively brought to a high level and a low level;

a delay circuit for delaying the output signal from the second output port of said OR/NOR circuit by a predetermined delay time τ and outputting the delayed signal; and an exclusive OR/NOR circuit having a first input port supplied with the output signal from the first output port of said OR/NOR circuit, a second input port supplied with the output signal from said delay circuit, and a first and a second output port from which demodulated signals are output, adapted such that, when input levels at said first and second input ports are in phase, output levels at said first and second output ports are respectively brought to a low level and a high level, and when input levels at said first and second input ports are in antiphase, output levels at said first and second output ports are respectively brought to a high level and a low level.

the demodulator being for use in a direct modulation phase shift keying system, in which an injection current supplied to a semiconductor laser, which outputs light with a frequency corresponding to the injection current, is varied for a predetermined modulation time t, which is shorter than one time slot T of a binary coded input signal, such that the integrated value of the frequency varied according to the injected current becomes a phase amount of $\pi$ or $-\pi$, said predetermined delay time $\tau$ being set to a time corresponding to one time slot T of the modulated signal.

2. A demodulator in an optical receiver for demodulating a modulated optical signal, comprising:

an OR/NOR circuit having an input port supplied with an intermediate-frequency signal obtained from the modulated optical signal and a first and a second output port, adapted such that, when the input level at said input port is at a low level, output levels of said first and second output ports are respectively brought to a low level and a high level and, when the input level at said input port is at a high level, output levels of said first and second output ports are respectively brought to a high level and a low level;

a delay circuit for delaying the output signal from the second output port of said OR/NOR circuit by a predetermined delay time $\tau$ and outputting the delayed signal; and an exclusive OR/NOR circuit having a first input port supplied with the output signal from the first output port of said OR/NOR circuit, a second input port supplied with the output signal from said delay circuit, and a first and a second output port from which demodulated signals are output, adapted such that, when input levels at said first and second input ports are in phase, output levels at said first and second output ports are respectively brought to a low level and a high level, and when input levels at said first and second input ports are in antiphase, output levels at said first and second output ports are respectively brought to a high level and a low level, wherein said demodulator for use in a continuous phase frequency shift keying system, and wherein said predetermined delay time $\tau$ is set to $\tau = T/2m$, where m represents the modulation index expressed as $m = \Delta F/B$, where $\Delta F$ represents the frequency shift and B represents the bit rate of the modulated signal, and T represents one time slot of the modulated signal.

3. A demodulator in an optical receiver for demodulating a modulated optical signal, comprising:

an OR/NOR circuit having an input port supplied with an intermediate-frequency signal obtained from the modulated optical signal and a first and a second output port, adapted such that, when the input level at said input port is at a low level, output levels of said first and second output ports are respectively brought to a low level and a high level and, when the input level at said input port is at a high level, output levels of said first and second output ports are respectively brought to a high level and a low level;

a delay circuit for delaying the output signal from the second output port of said OR/NOR circuit by a predetermined delay time $\tau$ and outputting the delayed signal; and an exclusive OR/NOR circuit having a first input port supplied with the output signal from the first output port of said OR/NOR circuit, a second input port supplied with the output signal from said delay circuit, and a first and a second output port from which demodulated signals are output, adapted such that, when input levels at said first and second input ports are in phase, output levels at said first and second output ports are respectively brought to a low level and a high level, and when input levels at said first and second input ports are in antiphase, output levels at said first and second output ports are respectively brought to a high level and a low level, wherein said demodulator for use in a direct modulation phase shift keying system, in which an injection current supplied to a semiconductor laser, which outputs light with a frequency corresponding to the injection current, is varied for a predetermined modulation time t, which is shorter than one time slot T of a binary coded input signal, such that the integrated value of the frequency varied according to the injected current becomes a phase amount of $\pi$ or $-\pi$, wherein said predetermined delay time $\tau$ is set to a time corresponding to one time slot T of the modulated signal, and wherein said predetermined modulation time t is set to $t = T/2$ m, where m represents a modulation index expressed as $m = \Delta F/B$, where $\Delta F$ represents the frequency shift and B represents the bit rate of the modulated signal, and T represents one time slot of the modulated signal.

4. A demodulator according to claim 3, wherein the modulation index m satisfies $0.5 < m$.

5. A polarization diversity receiver for coherent optical communication comprising:

an optical local oscillator outputting local light;

an optical-electrical converter for performing optical-electrical conversion of received signal light and said local light for each of polarization components, of which planes of polarization are orthogonal to each other, thereby outputting two intermediate-frequency signals having the frequency corresponding to the difference between the frequency of said signal light and the frequency of said local light, for each of said polarization components;

a first and a second demodulator respectively supplied with said intermediate-frequency signals; and a combining circuit for combining demodulated signals from said first and second demodulators;

wherein each of said first and second demodulators comprises:

an OR/NOR circuit having an input port supplied with the intermediate-frequency signal and a first and a second output port and adapted such that, when the input level at said input port is at a low level, output levels at said first and second output ports are respectively brought to a low level and a high level and, when the input level at said input port is at a high level, output levels at said first and second output ports are respectively brought to a high level and a low level;

a delay circuit for delaying the output signal from the second output port of said OR/NOR circuit by a predetermined delay time $\tau$ and outputting the delayed signal; and an exclusive OR/NOR circuit having a first input port supplied with the output signal from the first output port of said OR/NOR circuit, a second input port supplied with the output signal from said delay circuit, and a first and a second output port outputting demodulated signals, and adapted such that, when the input levels at said first and second input ports are in phase, output levels at said first and second output ports are respectively brought to a low level and a high level and, when the input levels at said first and second input ports are in antiphase, output levels at said first and second output ports are respectively brought to a high level and a low level.

6. A polarization diversity receiver for coherent optical communication according to claim 5, wherein said combining circuit is an adder for adding up a demodulated signal from the first output port of said exclusive OR/NOR circuit of said first demodulator and a demodulated signal from the first output port of said exclusive OR/NOR circuit of said second demodulator.

7. A polarization diversity receiver for coherent optical communication according to claim 5, wherein said combining circuit is an adder for adding up a demodulated signal from the second output port of said exclusive OR/NOR circuit of said first demodulator and a demodulated signal from the second output port of said exclusive OR/NOR circuit of said second demodulator.

8. A polarization diversity receiver for coherent optical communication according to claim 5, wherein said combining circuit is a subtractor for obtaining the difference between a demodulated signal from the first output port of said exclusive OR/NOR circuit of said first demodulator and a demodulated signal from the second output port of said exclusive OR/NOR circuit of said second demodulator.

9. A polarization diversity receiver for coherent optical communication according to claim 5, wherein said combining circuit is a subtractor for obtaining the difference between a demodulated signal from the second output port of said exclusive OR/NOR circuit of said first demodulator and a demodulated signal from the first output port of said exclusive OR/NOR circuit of said second demodulator.

10. A polarization diversity receiver for coherent optical communication according to claim 5, further comprising a first and a second variable gain amplifier for amplifying the intermediate-frequency signals supplied from said optical-electrical converter to said first and second demodulators, respectively, and a first gain controlling circuit for detecting power of said intermediate-frequency signals for each of the polarization components and controlling the gains of said first and second variable gain amplifiers so that the sum of the power of said intermediate-frequency signals may be kept constant.

11. A polarization diversity receiver for coherent optical communication according to claim 10, further comprising a third and a fourth variable gain amplifier for amplifying the demodulated signals supplied from said first and second demodulators to said combining circuit, respectively, and a second gain controlling circuit for detecting power of said intermediate-frequency signals for each of the polarization components and controlling the gains of said third and fourth variable gain amplifiers in accordance with a weighting function in which the ratio of power divided between said intermediate-frequency signals is taken as a parameter.

12. A polarization diversity receiver for coherent optical communication according to claim 11, wherein, when the ratio of power divided between the intermediate-frequency signals respectively input to said first and second demodulators is denoted as a: $(1-a)$, said weighting function f(a), using a cutoff point b expressed as $$b = 10^{-D/10},$$

where D (dB) represents the input dynamic range of said first and second demodulators, is set up as $$f(a) = \begin{cases} 0 & (0 \leq a \leq b) \\ a & (b < a \leq 1) \end{cases},$$

and the gains in said third and fourth variable gain amplifiers are controlled to be respectively proportional to af(a) and $(1-a)f(1-a)$.

13. A polarization diversity receiver for coherent optical communication according to claim 11, wherein, when the ratio of power divided between the intermediate-frequency signals respectively input to said first and second demodulators is denoted as a:$(1-a)$, said weighting function f(a), using a cutoff point b expressed as $$b = 10^{-D/10},$$

where D (dB) represents the input dynamic range of said first and second demodulators, and also using a function $$f_1(a) = a/F(\tfrac{1}{2} - a),$$

where $F(\tfrac{1}{2}-a)$ is an even function, is set up as $$f(a) = \begin{cases} 0 & (0 \leq a \leq b) \\ f_1(a) & (b < a \leq 1) \end{cases},$$

and the gains in said third and fourth variable gain amplifiers are controlled to be respectively proportional to af(a) and $(1-a)f(1-a)$.

14. A polarization diversity receiver for coherent optical communication according to claim 12 or 15, wherein said cutoff point b satisfies b<0.5.

15. A polarization diversity receiver for coherent optical communication according to claim 5, further comprising an automatic frequency control circuit for detecting the frequency of said intermediate-frequency signal and controlling the frequency of said local light so that said frequency of said intermediate-frequency signal may be kept constant.

16. A polarization diversity receiver for coherent optical communication according to claim 5, further comprising an automatic frequency control circuit for detecting average level of the demodulated signals and controlling the frequency of said local light so that said average level may be kept constant.

17. A polarization diversity receiver for coherent optical communication according to claim 5, wherein said optical-electrical converter comprises a first and a second polarization beam splitter respectively splitting the signal light and the local light into polarization components of which planes of polarization are orthogonal to each other, a first and a second optical coupler for adding together the polarization components output from said first and second polarization beam splitters that have the same plane of polarization and, further, bisecting the added signals and outputting the bisected signals, and a first and a second optical detecting circuit for respectively performing optical-electrical conversion of the light from said first and second optical couplers thereby outputting intermediate-frequency signals.

18. A polarization diversity receiver for coherent optical communication according to claim 17, wherein each of said first and second optical detecting circuits has a single photodetector element and said photodetector element is adapted to detect one of the divisions of the light beams bisected by each of said first and second optical couplers.

19. A polarization diversity receiver for coherent optical communication according to claim 17, wherein each of said first and second optical detecting circuits has a pair of photodetector element arranged in a double balanced type and said pair of photodetector elements are adapted to detect both of the divisions of the light beams bisected by each of said first and second optical couplers.

20. A polarization diversity receiver for coherent optical communication according to claim 5 for use in a differential phase shift keying system, wherein said predetermined delay time is set to a time corresponding to one time slot T of the modulated signal.

* * * * *